Dec. 8, 1959   H. G. DU BOIS   2,916,319
DECK LID LOCKING MECHANISM
Filed July 26, 1957   2 Sheets-Sheet 1
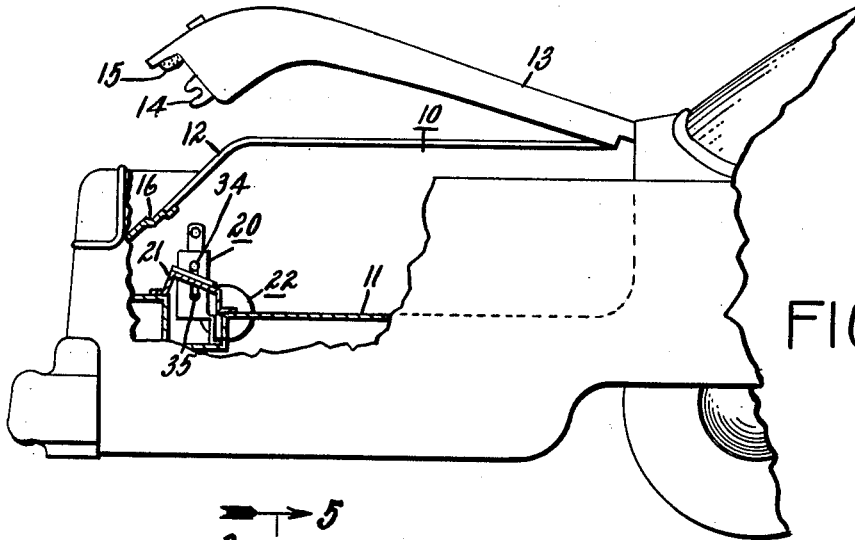
FIG. 1
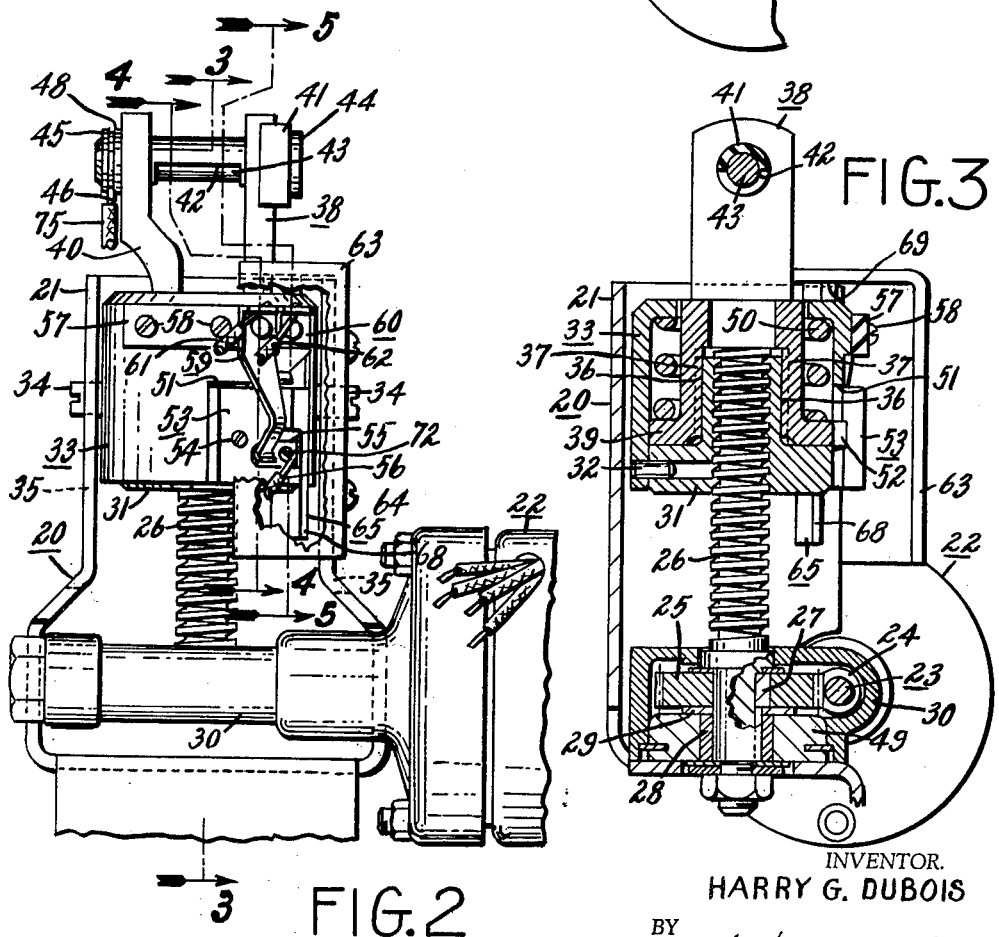
FIG. 2
FIG. 3
INVENTOR.
HARRY G. DUBOIS
BY
M. H. Strickland
HIS ATTORNEY

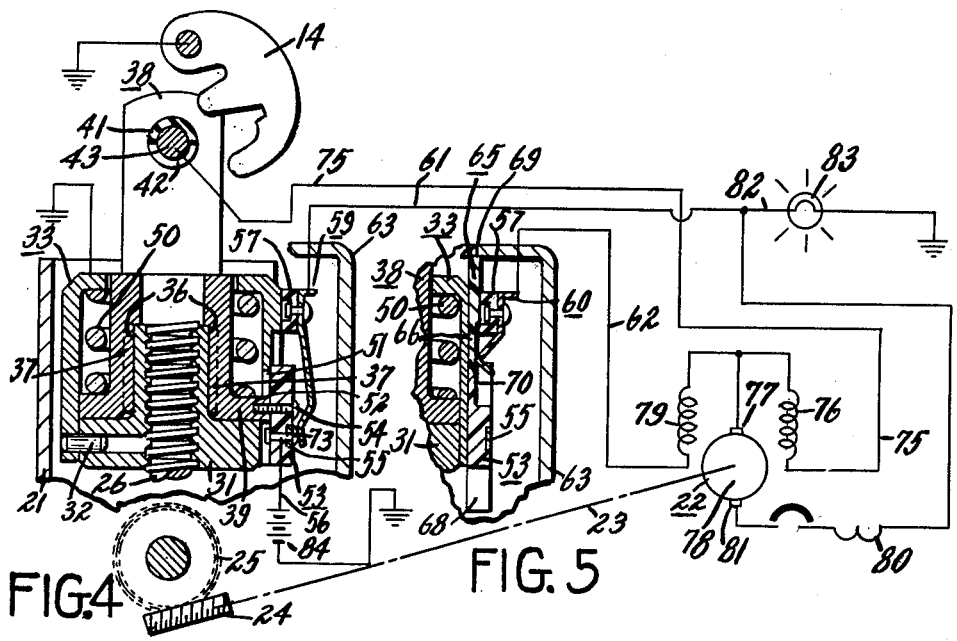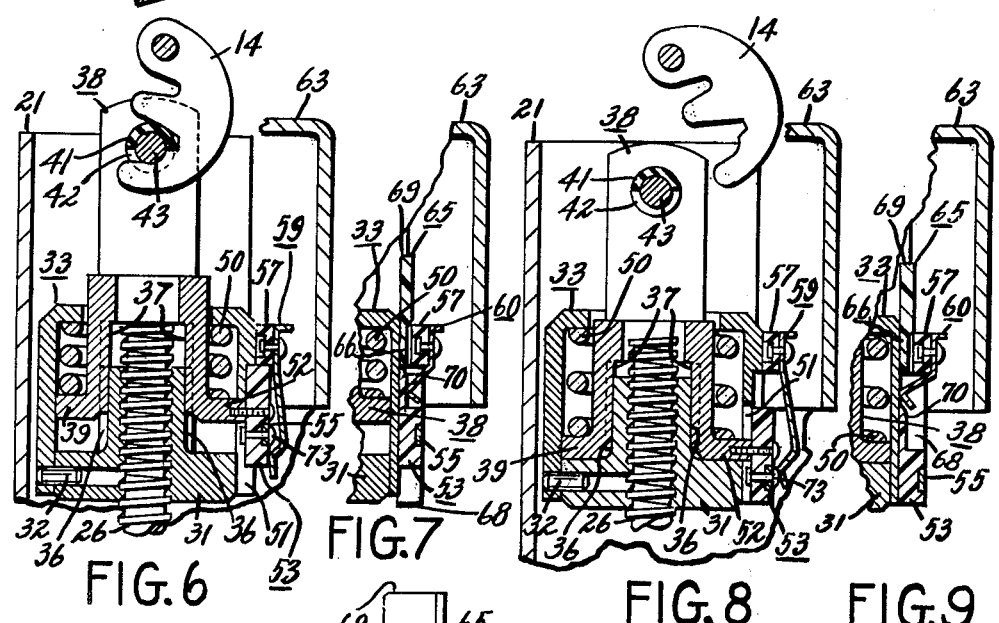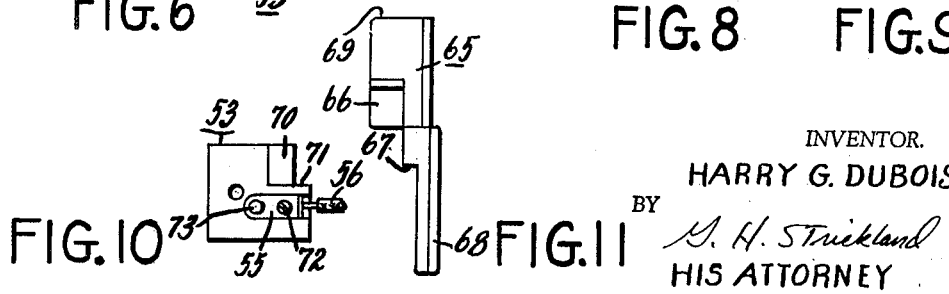

United States Patent Office 2,916,319
Patented Dec. 8, 1959

2,916,319

DECK LID LOCKING MECHANISM

Harry G. Du Bois, Tucson, Ariz., assignor to General Motors Corporation, Detroit, Mich., a corporation of Delaware Application July 26, 1957, Serial No. 674,532

15 Claims. (Cl. 292—341.16)

This invention pertains to power operated locking mechanism for closures, and particularly to locking mechanism for a deck lid of a motor vehicle.

Heretofore, it has been proposed to incorporate power operated mechanism for effecting the final closing movement and locking of the deck lid of a motor vehicle, such as disclosed in copending application Serial No. 557,713, Garvey et al., filed January 6, 1956, and assigned to the assignee of this invention.

The present invention relates to an improved actuator assembly for effecting the final closing movement and locking of a deck lid wherein the striker bar, or keeper, is resiliently supported, and wherein the switch mechanism for controlling the energization of the reversible electric motor is simplified. Accordingly, among my objects are the provision of improved power operated mechanism for effecting final closing movement of a closure member to a locked position, the further provision of power operated locking mechanism including a resiliently supported keeper; and the further provision of an electric motor operated locking mechanism including automatic switch means for controlling the energization and deenergization of the electric motor; and the still further provision of electric motor operated locking mechanism wherein the latch and keeper constitute a switch.

The aforementioned and other objects are accomplished in the present invention by resiliently supporting the keeper, or striker bar, in a housing so as to permit relative movement between the housing, which is reciprocated by a screw and nut type actuator, and the keeper. Specifically, the power locking mechanism is designed for use with a hinged deck lid of a vehicle, the deck lid having a conventional spring biased, hooked latch pivotally mounted thereon. The actuator assembly includes a reversible electric motor which is supported by a frame that is mounted on the floor of the rear compartment of the vehicle, the motor being connected through suitable reduction gearing to a substantially vertically arranged screw shaft. The screw shaft threadedly engages a nut which is restrained against rotation, the nut being connected to a reciprocable housing. The housing has mounted thereon a switch assembly comprising a contact block having a pair of leaf spring switch contact blades attached thereto. A plunger assembly of insulating material has tongue and groove connection with the nut and is disposed within the housing for movement relative thereto. The plunger assembly is engaged by one end of a coil spring, the other end of which engages a flange on the housing.

The plunger assembly carries a metallic keeper, or striker bar, which is connected to the lead wire of one winding of the split series electric motor. The plunger assembly has an insert of insulating material attached thereto carrying a contact which is connected to one battery terminal. The plunger carried contact can be engaged by one of the leaf spring contacts mounted on the housing, hereinafter called the battery leaf spring contact. The housing itself is connected to ground, and under certain conditions the other leaf spring contact engages the housing. The leaf spring contact engageable with the housing, hereinafter called the ground leaf spring contact, is connected to the lead wire of the other field winding of the split series motor, and the battery leaf spring contact is connected to one brush of the motor. The other brush is connected to the other lead wire of both series field windings.

The housing is supported for reciprocable movement relative to the frame which is attached to the vehicle. A slider of insulating material for actuating the ground leaf spring contact is slidably supported between the housing and the contact block. When the deck lid is open, the latch is disengaged from the keeper and the plunger assembly and keeper are fully extended. When the deck lid is manually moved to a position where the latch engages the keeper, the motor is energized to retract the plunger assembly and effect final closing movement and locking of the deck lid. After the deck lid engages its jamb, the housing moves downwardly relative to the keeper assembly thereby stressing the spring. When the housing moves a predetermined distance relative to the keeper assembly the battery leaf spring contact movable with the housing assembly will be disengaged from the plunger insert carried contact, the motor will be automatically deenergized and the deck lid will be locked. During keeper retraction the plunger insert prevents engagement of the ground leaf spring contact with the housing. However, upon release of the deck lid latch, which may be of the conventional key operated type, the keeper assembly moves downwardly relative to the housing under the urging of the spring so that the battery leaf spring contact engages the plunger insert carried contact and the ground leaf spring contact engages the housing carried contact to energize the motor to extend the keeper assembly and the housing. The motor will be automatically deenergized with the keeper in the fully extended position since during keeper extension the slider operatively engages the frame, and a predetermined movement of the keeper assembly thereafter will move the ground leaf spring contact out of engagement with the housing and into engagement with the insulated slider.

The circuit for the motor may also include an indicator light inside the vehicle which is connected to the battery leaf spring contact so as to visually indicate that the deck lid is open. The indicator light will be off when the deck lid is locked in the closed position since the battery leaf spring contact is disengaged from the insert contact.

Further objects and advantages of the present invention will be apparent from the following description, reference being had to the accompanying drawings, wherein a preferred embodiment of the present invention is clearly shown.

In the drawings:

Figure 1 is a fragmentary view, partly in section and partly in elevation, of a vehicle equipped with the deck lid closing mechanism of this invention.

Figure 2 is a fragmentary view with certain parts broken away, depicting the actuator assembly.

Figure 3 is a sectional view taken along line 3—3 of Figure 2.

Figure 4 is a sectional view depicting the position of the actuator and the battery leaf spring contact in the fully extended position taken along line 4—4 of Figure 2, and a schematic wiring diagram.

Figure 5 is a fragmentary sectional view of the ground leaf spring taken along line 5—5 of Figure 2.

Figure 6 is a view similar to view 4 depicting the parts of the actuator in the fully retracted, or locked position, Figure 7 is a view similar to Figure 5 with the actuator retracted.

Figure 8 is a view similar to Figure 4 depicting the position of the actuator parts upon release of the lid latch from the locked position.

Figure 9 is a view similar to Figure 5 upon release of the lid latch.

Figure 10 is a view, in elevation, of the contact carrying insert.

Figure 11 is a view, in elevation, of the slider.

With particular reference in Figure 1, a vehicle is shown having rear compartment 10 with a floor 11 and an access opening 12. The access opening 12 can be closed by a deck lid 13 which is hingedly connected to the vehicle body for swinging movement between open and closed positions. The deck lid 13 has pivotally mounted thereon a hook type latch 14, the latch being of the conventional spring biased type which may be key operated to move it to an unlatched position. In addition, the deck lid 13 carries a conventional sealing strip 15 engageable with a flanged jamb portion 16 of the vehicle body surrounding the access opening 12.

The deck lid locking actuator assembly of this invention is depicted generally by the numeral 20 in Figure 1 and is mounted on the floor 11 of the rear compartment. As seen in Figure 2, the actuator assembly includes a frame 21 constituting a support by which means the assembly is attached to the floor 11 of the vehicle compartment. A reversible electric motor 22 is suitably connected to the frame 21, and as seen in Figure 3 includes an armature shaft 23 having a worm 24 formed thereon. The worm 24 engages a worm gear 25 connected to a vertically arranged screw shaft 26 by means of a key 27. The screw shaft, or rotatable member, 26 is rotatably journalled by a sleeve bearing 28 carried by a ring 49 supported in a gear box housing 30 which is connected to the frame 21. A thrust washer 29 is interposed between the gear 25 and the bearing 28. Accordingly, upon rotation of the armature shaft 23, rotation will be imparted to the screw shaft 26.

A nut, or nonrotatable element, 31 threadedly engages the screw shaft 26. The nut is connected by a plurality of pins, such as indicated by numeral 32 to a reciprocable housing 33. The housing 33 is restrained against rotation relative to the frame 21 by a pair of shoulder screws 34 which threadedly engage the housing 33 and project through vertical slots 35 in the frame 21. Accordingly, upon rotation of the screw shaft 26, the nut 31 and the housing 33 will move lineally relative to the frame 21.

The nut 31 is also formed with a pair of diametrically opposed axially extending external grooves 36 which receive tongues 37 projecting from a right hand plunger 38. The right hand plunger 38 includes an arcuate portion 39 which extends around more than one-half of the circumference of the nut 31. The actuator assembly also includes a left hand plunger 40 having an arcuate portion which extends around the circumference of the nut 38 less than 180°. The two plungers 38 and 40 extend through the top of the housing 33 as shown in Figure 2. The upper end of each plunger is apertured, and the apertured ends receive a bushing 41 of insulating material having a medial slot 42. A metallic striker bar, or keeper 43 having a head portion 44 is inserted through the bushing 41. The left hand end of the striker bar 43 has an annular groove therein which receives a snap ring 45, a terminal 46 being clamped between the snap ring 45 and an insulating washer 48. Thereafter the left hand end of the striker bar may be staked to securely retain the terminal 46.

The striker bar 43 interconnects the right and left hand plungers 38 and 40, and the arcuate portions thereof which circumscribe the nut 31 are encircled by a coil type compression spring 50. One end of the compression spring 50 engages the flanged end of the housing 33, and the other end of the spring 50 engages the flanged portions of the plungers 38 and 40. As seen in Figure 3, the housing 33 has a slot 51 formed therein through which a portion 52 of the plunger 38 projects. The portion 52 of the plunger assembly 38 has attached thereto an insert 53 of insulating material, the insert 53 being connected to the plunger 38 by a screw such as indicated by numeral 54. The insert 53 has attached thereto a contact strip 55 connected to a wire 56. The housing 33 has a contact block 57 of insulating material attached thereto by means of screws 58. The terminal block 57 carries a pair of leaf spring contacts 59 and 60. The leaf spring contact 59 is substantially longer than the contact 60, and is connected to a wire 61. The shorter leaf spring contact 60 is connected to a wire 62. The frame 21 has a switch cover 63 attached thereto by screws 64 for enclosing the switch contacts aforedescribed.

A slider 65 of insulating material, as shown in Figure 11, is disposed between a portion of the contact block 57 behind the leaf spring contact 60 and the housing 33. As shown in Figure 11 the slider 65 includes a relatively thin portion 66 constituting a cam, an offset shoulder portion 67 and an elongated finger portion 68. The upper end 69 of the slider 65 is engageable with the switch cover 63 under certain instances, as will be pointed out more particularly hereinafter. The lower end of the finger 68 can engage the upper surface of the gear box housing 30 for testing operation of the actuator with the deck lid 13 open as will be pointed out more particularly hereinafter. As seen in Figure 10, the insert 53 of insulating material is likewise formed with a thin cam portion 70 and an offset shoulder 71. The contact strip 55 is attached to the insert by means of a screw 72 and carries a contact rivet 73. The distance between the shoulder 71 and the upper end of the cam portion 70 of the insert 53 is equal to the distance between the lower end of the cam portion 66 on the slider 65 and the offset shoulder 67 on the slider 65.

With particular reference to Figures 4 through 9, the energizing circuits for the motor 22 as well as the mode of operation will be described. The latch 14 carried by the deck lid 13 is electrically grounded. In addition, since the frame 21 of the actuator is connected to the floor 11 of the compartment 10, the frame 21 is also electrically grounded. Moreover, since the gear box housing 30, the screw shaft 26, the nut 31 and the housing 33 are composed of metal, and since these metallic parts are all effectively electrically connected to the frame 21, the housing 33 is likewise electrically grounded as schematically indicated in Figure 4. The terminal 46 attached to the striker bar, or keeper, 43 is connected to a wire 75, which is connected with one end of the retract series field winding 76 of the split series electric motor 22. The other end of the retract field winding 76 is connected to a brush 77 which engages a commutator of a conventional wound armature 78 in the motor 22. The leaf spring switch contact 59 is connected to a wire 61 through a thermal overload switch 80 to the other armature brush 81. The wire 61 is also connected to a wire 82 to one terminal of the indicator light 83 mounted on the instrument panel of the vehicle, the other terminal of the indicator light being electrically grounded.

The leaf spring contact 60 is connected by wire 62 to the extend series field winding 79 of the motor 22, the other end of the extend series field winding 79 being connected to the brush 77. The terminal strap 55 is connected by wire 56 to one terminal of a battery 84, the other terminal of which is electrically grounded.

As seen in Figures 4 and 5, the leaf spring contact 59, hereinafter referred to as the battery leaf spring contact, has an outwardly bowed portion and a flat portion engageable with the contact rivet 73. The leaf spring contact 60 has a V-shaped portion, as shown in Figure 5, and is hereinafter referred to as the ground leaf spring contact. The leaf spring contact 59 and the rivet contact 73 constitute a limit switch for deenergizing the motor 22 in the fully retracted position. The leaf spring contact 60 can be moved out of engagement with the housing 33 by the cam portion 66 of slider 65, and constitutes a limit switch for deenergizing the motor 22 when the actuator is fully extended. The cam portion 70 of the insert 53 is interposed between the contact 60 and the housing 33 during retract, or downward movement of the housing relative to the keeper assembly including plungers 38 and 40 and the keeper 43. The offset shoulder 71 is engageable with the offset shoulder 67 in both the fully extended and fully retracted position of the keeper assembly, as will be pointed out more particularly hereinafter.

Operation of the actuator is as follows. The actuator is shown with the keeper 43 fully extended in Figure 4. Upon movement of the deck lid 13 towards the closed position so that the latch 14 engages the keeper 43, the motor 22 will be energized to retract the keeper assembly. Thus, when the latch 14 which is electrically grounded engages the keeper 43, the retract field winding 76 of the motor 22 will be energized from ground through the latch 14, the keeper 43, the wire 75, through winding 76, the brush 77, through the armature 78, the brush 81, through the overload switch 80, the wire 61, the battery leaf spring contact 59, the contact rivet 73, the wire 56 from the battery 84. When the deck lid 13 is open and until the keeper is fully retracted, the indicator light 83 will be on since it is connected to the battery through wire 82, wire 61, contact 59, contact 73 and the wire 56. With the retract field winding 76 energized, the reversible motor 22 will rotate the screw shaft 26 so as to effect downward movement of the nut 31. The keeper assembly including the keeper 43 and the plungers 38 and 40 are likewise moved downwardly with the nut 31 until the deck lid engages the jamb 16 thereby preventing further downward movement of the keeper assembly. Thereafter continued downward movement of the nut 31 and housing 33 will compress the spring 50, and upon a predetermined relative movement between the nut 31 and the keeper assembly, which results in a predetermined stress of the spring 50, to the position as shown in Figure 6, the leaf spring contact 59 will move out of engagement with the contact 73. When this occurs the motor 22 will be deenergized. The switch contact moves relative to the switch contact 73 during compression of the spring 50 since the contact 59 is movable with the housing 33 which is connected by pins 32 with the nut 31, and the contact rivet 73 is carried by the insert 53 attached to the plunger 38 of the keeper assembly. The actuator has now completed the final closing movement of the deck lid 13 and the deck lid is locked in the closed position.

During retraction of the keeper assembly the slider 65 moves downwardly with the housing 33 until movement of the keeper assembly is arrested. At this point the shoulder 71 which engages the shoulder 67 will cause the slider 65 to move upwardly relative to the housing 33 since the plunger 38 of the keeper assembly remains in a relatively fixed position during continued downward movement of the housing 33 while the spring 50 is being compressed. Thus, at this time the ground leaf spring contact 60 will move off the cam portion 66 of the insert 65 and onto the cam portion 70 of the insert 53. While the slider 65 is movable relative to the housing 33, it frictionally engages both the housing 33 and the contact block 57 so that the slider 65 cannot move relative to the housing 33 by the force of gravity alone.

With the trunk lid locked and the actuator in a fully retracted position as shown in Figure 6, the actuator will automatically move to the fully extended position of Figure 4 when the key operated latch 14 is moved out of engagement with the keeper 43. When the latch 14 is disengaged from the keeper 43, the spring 50 which is also stressed during relative movement between the housing 33 and the plunger 38 of the keeper assembly, will move the plunger 38 of the keeper assembly downwardly relative to the housing so that the bottom thereof engages the nut 31 as shown in Figure 8. This downward movement of the keeper assembly relative to the housing 33 will carry the insert 53 downwardly so that the contact rivet 73 will again engage the battery leaf spring contact 59. Simultaneously, downward movement of the insert 53 relative to the slider 65 will move the cam portion 70 relative to the ground leaf spring contact 60, so that the ground leaf spring contact 60 will engage the housing 33 as shown in Figure 9. Accordingly, the extend field winding 79 of the motor 22 will be energized from the housing 33, the leaf spring contact 60, the wire 62, through the winding 79, to the brush 77, throuugh the armature 78, the brush 81, the overload switch 80, the wire 61, the leaf spring contact 59, the contact rivet 73 and the wire 56 to the battery 84. The screw shaft 26 will now be rotated in a direction effecting upward movement of the nut 31 which carries with it the keeper assembly and the housing 33. As the housing 33 moves upwardly the end 69 of the slider will engage the overhanging portion of the cover 63, and upon continued movement of the housing 33 the slider 65 will be moved downwardly relative to the housing so that when the housing 33 and the keeper assembly arrive in the fully extended position of Figure 4, the cam portion 66 of the slider 65 will move between the housing 33 and the leaf spring contact 60 thereby deenergizinng the motor 22. It is pointed out that the indicator light 83 is on at all times except when the keeper assembly is in the fully retracted position of Figure 6 wherein the contact 59 does not engage the contact 73.

In order to test the operation of the limit switch mechanism and to ascertain whether the motor is operative without closing the deck lid 13, with the keeper assembly in the fully extended position of Figure 4, the keeper 43 can be connected to ground by means of a screw driver or other metallic object in contact with the keeper 43 and the vehicle body. This will cause energization of the retract field winding 76 and cause the motor 22 to rotate the screw shaft 26 so as to move the housing 33 and the keeper assembly downwardly relative to the frame 21. However, since the keeper assembly including the plunger 38 is not restrained against movement by engagement of the deck lid with the jamb 16, the plunger 38 will remain in contact with the nut 31, and hence the contact 59 will not move relative to the contact 73 carried by the insert 53. Therefore, while the actuator will be tested for retracting movement, the extending energizing circuit will not be closed unless the slider 65 is moved relative to the housing 33. Since the slider 65 is enclosed by the cover 63, the extending finger 68 is employed to automatically move the plunger upwardly relative to the housing 33 when the end of the finger 68 engages the gear box housing 30. When this occurs, the contact 60 which is in engagement with the cam portion 66 of the slider 65 is moved upwardly relative thereto permitting the contact 60 to engage the housing 33. Accordingly, when the ground connection to the keeper 43 is removed, the extend energizing circuit will be completed, and the keeper assembly will automatically move to the fully extended position at which point the motor will be deenergized by movement of the slider relative to the housing so that the cam portion 70 moves the contact 60 out of engagement with the housing 33.

From the foregoing it is apparent that the present invention provides a simplified power operated deck lid actuating mechanism wherein the keeper and the latch constitute switch contacts in the retracting energizing circuit, and wherein the mechanism includes automatic limit switch means for deenergizing the motor in both the fully extended and fully retracted positions.

While the embodiment of the invention as herein disclosed constitutes a preferred form, it is to be under-

What is claimed is as follows:

1. Mechanism for locking a deck lid of a vehicle which is swingably mounted, said deck lid having a latch, including, a reversible electric motor, a rotatable member connected to said motor so as to be rotated upon motor energization, a reciprocable element restrained against rotation and connected to the rotatable member whereby rotation of said member effects linear movement of the element, a housing enclosing said reciprocable element, a keeper assembly having a portion disposed within the housing, resilient means disposed between said keeper assembly and said housing and permitting relative movement therebetween, cooperable switch parts carried by said housing and said keeper assembly for controlling energization of said motor, and a stationary frame supporting said housing for reciprocable movement whereby a predetermined relative movement between said housing and said keeper assembly in one direction will stress said resilient means and separate said cooperable switch parts to deenergize said motor.

2. Power operated keeper mechanism including, a stationary frame, a reversible electric motor supported by said frame, a member journalled in said frame and connected to the motor for rotation thereby, a nonrotatable element operatively connected to said member whereby rotation of said member will effect reciprocation of said element, a housing supported on said frame and connected to said element, a keeper assembly reciprocable relative to said element but restrained against rotation relative thereto, resilient means disposed between said housing and said keeper assembly for permitting relative reciprocation between the keeper assembly and the housing, and an energizing circuit for said motor including a limit switch having a contact carried by said housing and a contact carried by said keeper assembly whereby a predetermined relative movement between said keeper and said housing will separate said contacts and deenergize said motor.

3. The mechanism set forth in claim 2 wherein one of the contacts of said limit switch comprises a leaf spring operatively connected to said housing for movement therewith and wherein the other of said contacts comprises a rivet operatively connected to and movable with said keeper assembly.

4. Power operated keeper mechanism including, a stationary frame, a reversible electric motor supported by said frame, a member rotatably supported in said frame and operatively connected to said motor for rotation thereby, a reciprocable housing disposed within said frame and restrained against rotation relative thereto, a nonrotatable element connected to said housing and engaging said rotatable member whereby rotation of said member will effect reciprocation of said element and said housing relative to said frame, a keeper assembly having a tongue and groove connection with said element and having a portion disposed within said housing, resilient means disposed between said housing and said portion of the keeper assembly for permitting relative movement between the keeper assembly and the housing, and an energizing circuit for said motor including a pair of limit switches for automatically deenergizing said motor when the keeper assembly is fully extended or fully retracted.

5. The mechanism set forth in claim 4 wherein the limit switch for automatically deenergizing said motor with the keeper assembly fully retracted includes a contact carried by said housing and a contact carried by said keeper assembly whereby a predetermined relative movement between said keeper assembly and said housing will separate the contacts to deenergize said motor.

6. The mechanism set forth in claim 4 wherein the housing is electrically grounded, and wherein the limit switch for deenergizing said motor with the keeper assembly fully extended includes a contact carried by said housing for movement therewith and engageable with said housing to complete a circuit for energizing said motor to extend said keeper assembly, and means operatively engageable with said frame and slidable relative to said housing for moving said contact out of engagement with said housing to deenergize said motor with the keeper assembly in the fully extended position.

7. Power operated keeper mechanism including, a stationary frame, a reversible electric motor supported by said frame, a member rotatably supported in said frame and connected to said motor for rotation thereby, a reciprocable housing disposed within said frame and restrained against rotation relative thereto, said housing being electrically grounded, a nonrotatable element connected to said housing and engaging said rotatable member whereby rotation of said member will effect reciprocation of said element, a reciprocable keeper assembly having a portion disposed within said housing slidably engaging said element and restrained against rotation relative thereto, resilient means disposed between said housing and said portion of the keeper assembly for permitting relative movement between the keeper assembly and the housing, a contact block of insulating material attached to said housing, an insert of insulating material attached to said keeper assembly, a slider of insulating material having a portion disposed between said contact block and said housing, and energizing circuits for said motor including limit switches having contacts carried by said contact block for automatically deenergizing said motor when the keeper assembly is fully extended or fully retracted.

8. The mechanism set forth in claim 7 wherein the limit switch for automatically deenergizing said motor with the keeper assembly fully retracted comprises a leaf spring contact attached to said contact block and a contact carried by said insert whereby a predetermined relative movement between said housing and said keeper assembly will separate said contacts and deenergize said motor with the keeper fully retracted.

9. The mechanism set forth in claim 7 wherein the limit switch for deenergizing said motor with the keeper in the fully extended position comprises a leaf spring contact carried by said contact block and engageable with said housing, and wherein said slider is moved into operative engagement with said frame during extending movement of said keeper assembly and includes a cam portion engageable with said leaf spring contact for moving it out of engagement with said housing when the keeper assembly is fully extended so as to deenergize said motor.

10. In combination, a structure having a compartment with an access opening, a closure member hinged to said structure for closing the access opening and having a latch, a keeper engageable with said latch, and power operated mechanism for retracting and extending said keeper comprising a reversible electric motor, a frame attached to said structure for supporting said motor, a member rotatably supported by said frame and connected to said motor for rotation thereby, a reciprocable housing disposed within said frame and restrained against rotation relative thereto, a nonrotatable element connected to said housing and engaging said rotatable member whereby rotation of said member will effect reciprocation of said element, means operatively connecting the keeper and said element so that said keeper is reciprocable relative thereto although restrained against rotation relative to said element, resilient means disposed between said housing and said connecting means for permitting relative reciprocation between the keeper and the housing, and energizing circuits for said motor for effecting retracting and extending movement of said keeper, said retracting energizing circuit including a switch contact connected for movement with said housing, a switch contact movable with said keeper, and switch contacts comprising the keeper and the latch, said extending energizing circuit including said switch contact movable with the housing engageable with said switch contact movable with the keeper, and a second switch contact movable with the housing engageable with a housing contact.

11. The combination set forth in claim 10 wherein said latch is electrically grounded and wherein the contact movable with the keeper is connected to a source of electric current whereby upon engagement of the latch with the keeper, and engagement of said one contact movable with the housing and said contact movable with the keeper, said motor will be energized for rotation in one direction to retract said keeper, and upon a predetermined relative movement between said housing and said keeper to stress said resilient means a predetermined amount, the one switch contact movable with the housing will be disengaged from the switch contact movable with the keeper so as to automatically deenergize said motor with the keeper in the fully retracted position.

12. The combination set forth in claim 10 wherein said housing is electrically grounded, and wherein the contact movable with said keeper is connected to a source of electric power, the energizing circuit for said motor to effect extending movement of said keeper being closed upon disengagement of the latch and the keeper whereupon said one contact movable with said housing engages the contact movable with the keeper and the other of the contacts movable with the housing engages said housing contact, and wherein said power operated mechanism includes a means engageable with said frame for moving said other contact movable with the housing out of engagement with said housing contact when the keeper is fully extended.

13. In a vehicle having a body with a closure member hinged thereon and latch mechanism mounted on said closure member, power operated extendable and retractable keeper mechanism including a keeper assembly supported on said body for moving said closure member from a partially open position to a closed position and imposing a predetermined load on said keeper assembly and said latch mechanism after said closure member has been moved to the closed position, said power operated keeper mechanism including reversible motor means, a reciprocable housing operatively connected with said motor means and enclosing a portion of said keeper assembly, resilient means disposed within said housing and engaging said keeper assembly and said housing, said resilient means constituting a driving connection between said keeper assembly and said housing whereby said keeper assembly is operable to move said closure member from the partially open position to the closed position whereat movement of the keeper assembly is arrested and continued movement of said housing stresses said resilient means to impose a load on said keeper assembly, and means for automatically inactivating said motor means when said resilient means imposes said predetermined load on said keeper assembly and said latch mechanism.

14. In a vehicle having a body with a closure member hinged thereon and a latch mechanism mounted on said closure member, power operated extendable and retractable keeper mechanism including a keeper assembly supported on said body for moving said closure member from a partially open position to a closed position and imposing a predetermined load on said keeper assembly and said latch mechanism after the closure member has been moved to the closed position, said power operated keeper mechanism including a reversible electric motor, a rotatable screw shaft operatively connected with said motor, a reciprocable nut engaging said screw shaft, a reciprocable housing connected to said nut and enclosing a portion of said keeper assembly, resilient means disposed within said housing and engaging said keeper assembly and said housing, said resilient means constituting a driving connection between said keeper assembly and said housing whereby said keeper assembly is operable to move said closure member from the partially open position to the closed position whereat movement of the keeper assembly is arrested and continued movement of said housing stresses said resilient means to impose a load on said keeper assembly, and an energizing circuit for said motor including a limit switch actuated upon a predetermined relative movement between said housing and said keeper assembly for deenergizing said motor when said resilient means imposes said predetermined load on said keeper assembly and said latch mechanism.

15. Power operated extendable and retractable keeper mechanism including, a stationary frame, a reversible electric motor supported by said frame, a rotatable screw shaft journalled in said frame and connected to said motor, a reciprocable nut engaging said screw shaft, a reciprocable housing connected to said nut and engaging said frame so as to be restrained against rotation whereby rotation of said screw shaft will effect reciprocation of said nut and said housing, a reciprocable keeper assembly having a portion disposed within said housing, resilient means disposed within said housing and engaging said keeper assembly and said housing, said resilient means constituting a driving connection between said keeper assembly and said housing and permitting relative movement between said housing and said keeper assembly when movement of said keeper assembly is arrested, relative movement between said housing and said keeper assembly stressing said resilient means to impose a load on said keeper assembly, and an energizing circuit for said motor including a limit switch actuated upon a predetermined relative movement between said housing and said keeper assembly for automatically deenergizing said motor when said resilient means impose a predetermined load on said keeper assembly.

References Cited in the file of this patent
UNITED STATES PATENTS

| | | |
|---|---|---|
| 2,688,865 | Foster | Sept. 14, 1954 |
| 2,741,503 | Thompson | Apr. 10, 1956 |
| 2,753,202 | Smith et al. | July 3, 1956 |